United States Patent
Wang et al.

(10) Patent No.: US 6,874,352 B2
(45) Date of Patent: Apr. 5, 2005

(54) METHOD AND APPARATUS FOR LOCATING INTERNAL TRANSFER LEAKS WITHIN FUEL CELL STACKS

(75) Inventors: Zhaoyu Wang, Cambridge (CA); Stephan Lutz, Berlin (DE); Karl D. Inglehart, Surrey (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/754,451

(22) Filed: Jan. 9, 2004

(65) Prior Publication Data

US 2004/0209127 A1 Oct. 21, 2004

(Under 37 CFR 1.47)

Related U.S. Application Data

(60) Provisional application No. 60/438,915, filed on Jan. 9, 2003.

(51) Int. Cl.[7] .......................... G01M 3/04; G01M 3/08; H01M 8/00
(52) U.S. Cl. ......................... 73/40.7; 73/40.5 R; 429/13
(58) Field of Search ............................. 73/40.7, 40.5 R; 429/13

(56) References Cited

U.S. PATENT DOCUMENTS

| | | | | |
|---|---|---|---|---|
| 3,087,327 A | * | 4/1963 | Kagi | 73/40.7 |
| 3,425,264 A | * | 2/1969 | Frei | 73/40.5 R |
| 4,424,708 A | * | 1/1984 | Meuleman | 73/40 |
| 5,230,966 A | | 7/1993 | Voss et al. | |
| 5,235,846 A | | 8/1993 | Fanciullo | |
| 5,284,718 A | | 2/1994 | Chow et al. | |
| 5,763,113 A | | 6/1998 | Meltser et al. | |
| 5,763,765 A | * | 6/1998 | Lamont et al. | 73/40.7 |
| 6,662,633 B2 | * | 12/2003 | Pratt | 73/40.5 R |

FOREIGN PATENT DOCUMENTS

| | | |
|---|---|---|
| DE | 196 49 434 C1 | 1/1998 |
| DE | 196 49 436 C1 | 1/1998 |
| EP | 0 827 226 A2 | 3/1998 |
| JP | 59-149660 | 8/1984 |
| JP | 61-279071 | 12/1986 |
| JP | 62-115670 | 5/1987 |
| JP | 6223850 | 8/1994 |
| JP | 8-185878 | 7/1996 |

* cited by examiner

*Primary Examiner*—Michael Cygan
(74) *Attorney, Agent, or Firm*—Seed IP Law Group PLLC

(57) ABSTRACT

A method for locating a fluid leak in a fuel cell stack is disclosed. The method comprises pressurizing a first fluid stream passage with a tracer fluid, introducing a flow fluid to a second fluid stream passage, maintaining a substantially constant flow of the flow fluid through the second fluid stream passage toward an exit point of the fuel cell stack, inserting a probe, adapted to monitor for the presence of the tracer fluid in the flow fluid, into the exit point, moving the probe through the second fluid stream passage and monitoring for the presence of the tracer fluid in the flow fluid at various locations of the second fluid stream passage. An apparatus for locating a fluid leak in a fuel cell stack is also provided.

14 Claims, 3 Drawing Sheets

METHOD AND APPARATUS FOR LOCATING INTERNAL TRANSFER LEAKS WITHIN FUEL CELL STACKS

CROSS-REFERENCE TO RELATED APPLICATION

This application claims the benefit of U.S. Provisional Patent Application No. 60/438,915 filed Jan. 9, 2003, where this provisional application is incorporated herein by reference in its entirety.

FIELD OF THE INVENTION

The present invention is generally directed to a method and apparatus for locating fluid leaks in a fuel cell stack.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cells typically employ a membrane electrode assembly ("MEA") consisting of a solid polymer electrolyte or ion exchange membrane disposed between the two electrode layers. The membrane, in addition to being an ionically conductive (typically proton conductive) material, also acts as a barrier for isolating the reactant (i.e. fuel and oxidant) streams from each other.

The MEA is typically interposed between two separator plates, which are substantially impermeable to the reactant fluid streams, to form a fuel cell assembly. The plates act as current collectors, provide support for the adjacent electrodes, and typically contain flow field channels for supplying reactants to the MEA or circulating coolant. The plates, which include the flow field channels, are typically known as flow field plates. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel stream that is supplied to the anode separator plate typically comprises hydrogen. For example, the fuel stream may be a gas such as substantially pure hydrogen or a reformate stream containing hydrogen. Alternatively, a liquid fuel stream such as aqueous methanol may be used. The oxidant stream, which is supplied to the cathode separator plate, typically comprises oxygen, such as substantially pure oxygen, or a dilute oxygen stream such as air.

The electrochemical reactions in a solid polymer fuel cell are generally exothermic. Accordingly, a coolant is typically also used to control the temperature within a fuel cell assembly to prevent overheating. Conventional fuels cells employ a liquid, such as water, to act as a coolant. In conventional fuel cells, the coolant stream is fluidly isolated from the reactant streams.

Thus, conventional fuel cells typically employ three fluid streams, namely fuel, oxidant, and coolant streams, which are fluidly isolated from one another. See, for example, U.S. Pat. No. 5,284,718 and U.S. Pat. No. 5,230,966, which are incorporated herein by reference in their entirety.

Fluid isolation is important for several reasons. One reason for fluidly isolating the fuel and oxidant streams from one another in a fuel cell is that hydrogen and oxygen are particularly reactive with each other. Accordingly, the membrane and plates are, therefore, substantially impermeable to hydrogen and oxygen. One reason for fluidly isolating the coolant fluid from the reactant fluids is to prevent dilution and contamination of the reactant streams. Water, which is typically used as a coolant, may cause flooding in the reactant fluid passages that prevents the reactants from reaching the electrochemically active membrane-electrode interface. It is also undesirable for the reactant streams to leak into the coolant stream because this reduces operating efficiency as the leaked reactants are not used to generate electrical power. One reason for preventing leakage of any of the fluids to the surrounding atmosphere is the general negative impact such leakage can have on fuel cell stack safety, performance and longevity.

Locating the source of fluid leaks has been found to be problematic. Once a fluid leak has been detected within a fuel cell stack (which is usually done by constant monitoring of the exhaust streams), locating the source of the leak is typically accomplished by disassembling the fuel cell stack into its constituent parts and testing each fuel cell individually. Such method is time consuming and, consequently, expensive. Furthermore, because the disassembling and individual fuel cell testing process can cause further damage/defects to the stack, such method can result in a worsening of the fluid integrity of a fuel cell stack.

Accordingly, there is a need for improved methods and apparatus for detecting and locating fluid leaks within a fuel cell stack. The present invention fulfils this and other needs and provides further related advantages.

BRIEF SUMMARY OF THE INVENTION

The invention provides a method for locating a fluid leak in a fuel cell stack. The method comprises pressurizing a first fluid stream passage with a tracer fluid, introducing a flow fluid to a second fluid stream passage, maintaining a substantially constant flow of the flow fluid through the second fluid stream passage toward an exit point of the fuel cell stack, inserting a probe, adapted to monitor for the presence of the tracer fluid in the flow fluid, into the exit point of the fuel cell stack, moving the probe through the second fluid stream passage and monitoring for the presence of the tracer fluid in the flow fluid at various locations of the second fluid stream passage.

Where the fuel cell stack comprises a plurality of fuel cell assemblies, the probe may be moved through the second fluid stream passage one fuel cell assembly at a time and the presence of the tracer fluid in the flow fluid may be monitored at each fuel cell assembly.

Prior to inserting the probe into the exit point of the fuel cell stack, the presence of the tracer fluid in the flow fluid exiting from the exit point of the fuel cell stack may be monitored.

The first fluid stream passage may be a fuel stream passage and the second fluid stream passage may be an oxidant stream passage. The tracer fluid may be helium and the flow fluid may be air.

The invention also provides an apparatus for locating a fluid leak in a fuel cell stack. The apparatus comprises a supply system for pressurizing a first fluid stream passage with a tracer fluid, introducing a flow fluid to a second fluid stream passage and maintaining a substantially constant flow of the flow fluid through the second fluid stream passage toward an exit point of the fuel cell stack. The apparatus also comprises a probe, adapted to monitor for the presence of the tracer fluid in the flow fluid. The apparatus also comprises means for inserting the probe into the exit point of the fuel cell stack and moving the probe through the second fluid stream passage.

The apparatus may further comprise a fuel cell stack compressor adapted to place the fuel cell stack in a state of compression similar to what it would be in during operation of the fuel cell stack.

Many specific details of certain embodiments of the invention are set forth in the detailed description below to provide a thorough understanding of such embodiments. One skilled in the art, however, will understand that the present invention may have additional embodiments, or may be practiced without several of the details described.

BRIEF DESCRIPTION OF THE DRAWING(S)

DETAILED DESCRIPTION OF PREFERRED EMBODIMENT

The present method and apparatus allow fuel cells, such as solid polymer electrolyte fuel cells, in a fuel cell stack to be checked for fluid leaks and for such leaks to be located prior to the fuel cell stack being put into operation (for example, after assembly or during routine maintenance). Leaks between the fuel and oxidant flow passages or between the coolant flow passage and one, or both, of the reactant flow passages are generally known as internal transfer leaks. Leaks that result in fuel, oxidant or coolant escaping from the fuel cell stack to the surrounding environment are generally known as external leaks.

Figure 1:
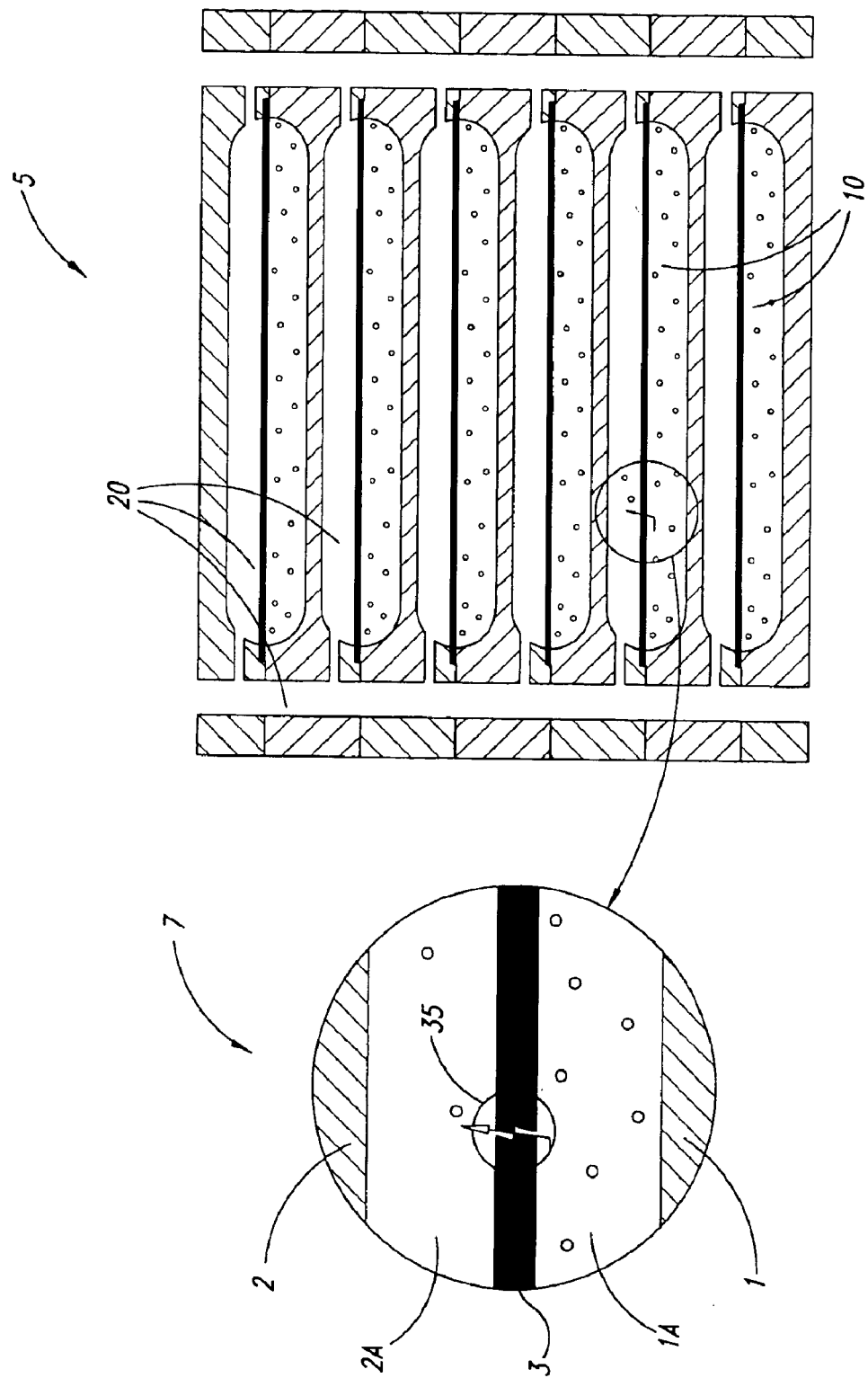
FIG. 1 shows a schematic diagram of a representative fuel cell stack.

FIG. 1 shows a schematic diagram of a representative fuel cell stack 5. As shown in FIG. 1, fuel cell stack 5 comprises a plurality of fuel cell assemblies 7. An individual fuel cell assembly 7 comprises a fuel flow field plate 1 and an oxidant flow field plate 2, separated by an MEA 3. Fuel flow field channels 1A supply fuel to MEA 3. Oxidant flow field channels 2A supply oxidant to MEA 3. As shown in FIG. 1, oxidant flow field channels 2A are fluidly connected to one another, forming an oxidant stream passage 20 through fuel cell stack 5. Similarly, fuel flow field channels 1A are fluidly connected to one another, forming a fuel stream passage 10 through fuel cell stack 5 (this is not specifically shown in FIG. 1). Neither coolant flow fields nor a coolant stream passage are shown in FIG. 1, however, it is understood that a number of coolant flow fields, forming a coolant stream passage, may be present in fuel cell stack 5, and that the apparatus and method described can be applied to detect and locate internal transfer leaks between coolant and reactant stream passages.

During normal operation of fuel cell stack 5, fuel is directed to fuel stream passage 10 via an inlet port and exits via an outlet port (not shown). Similarly, oxidant is directed to oxidant stream passage 20 via an inlet port and exits via an outlet port (not specifically shown). For simplicity purposes, FIG. 1 does not show fluid flow direction during normal operation of fuel cell stack 5 nor does it show all outer boundaries of oxidant stream passage 20. Fuel stream passage 10 and oxidant stream passage 20 are fluidly isolated from each other by a barrier, which may include one or more plates and/or MEAs which cooperate with other sealing mechanisms such as, for example, compression seals, gaskets and/or adhesives for fluidly isolating fuel stream passage 10 and oxidant stream passage 20. As shown in FIG. 1, one or more MEA(s) 3 may comprise a defect 35 which causes an internal transfer leak to occur between fuel flow field channels 1A and oxidant flow field channels 2A of the relevant fuel cell assembly 7, thereby leading to an internal transfer leak between fuel stream passage 10 and oxidant stream passage 20.

The following method can be used to locate such internal transfer leak, namely to determine which MEA(s) 3 comprise(s) defect(s) 35. In the embodiment shown in FIG. 2, fuel stream passage 10 is pressurized with a tracer fluid up to a pressure P. Pressure P is kept substantially constant throughout the operation of the method. Any pressure P, which results in the tracer fluid migrating from fuel stream passage 10 through defect(s) 35 into oxidant stream passage 20, but which does not damage components of fuel cell stack 5, is appropriate (an example of such migration is shown by arrow M in FIG. 2). The tracer fluid is preferably a fluid that is substantially chemically stable and inert (i.e. non-reactive) and easily detectable, such as helium. A substantially constant fluid flow F is introduced into oxidant stream passage 20. Fluid flow F ensures that the tracer fluid, migrating from fuel stream passage 10 through defect(s) 35 into oxidant stream passage 20, is directed towards an exit point of fuel cell stack 5. Fluid flow F is preferably a fluid that is substantially chemically stable and inert (i.e. non-reactive), such as air. In the embodiment shown in FIG. 2, fluid flow F is produced by introducing an air current A into orifices 21 and 23, closing orifice 22 and leaving orifice 24 open for fluid flow F to exit fuel cell stack 5. As a result, the tracer fluid migrating from fuel stream passage 10 through defect(s) 35 into oxidant stream passage 20 is directed towards an exit point of fuel cell stack 5, in this case orifice 24. The exit point may coincide with an exit manifold of oxidant stream passage 20.

Figure 3:
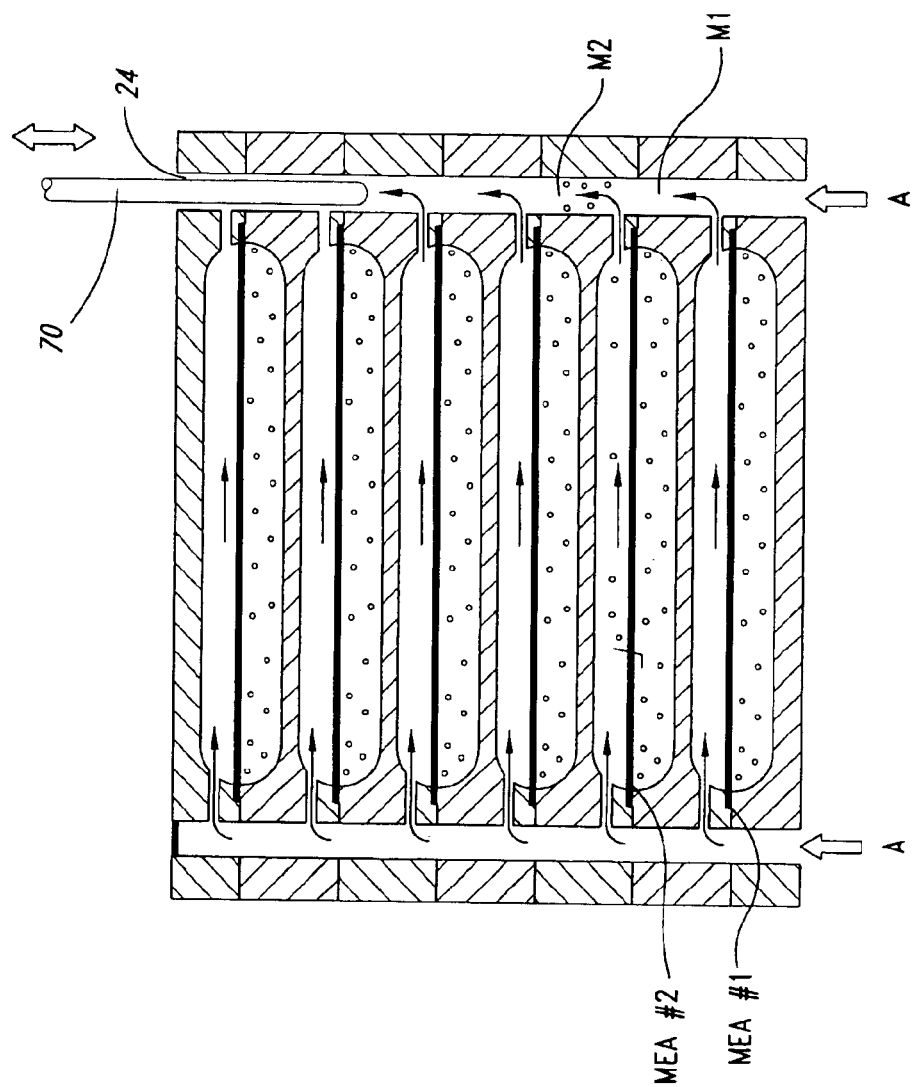
FIG. 3 illustrates further steps of a representative method for locating internal transfer leaks within the fuel cell stack of FIG. 1.

The composition of fluid flow F flowing through oxidant stream passage 20 and exiting fuel cell stack 5 via orifice 24 is then ascertained. As shown in FIG. 3, a probe 70, which is adapted to monitor for the presence of the tracer fluid within fluid flow F, is inserted into oxidant stream passage 20 through orifice 24. Probe 70 is moved through oxidant stream passage 20 while monitoring for the presence of the tracer fluid within fluid flow F. In a more specific embodiment, probe 70 can be moved through oxidant stream passage 20 one fuel cell assembly 7 at a time. In this way, the MEA(s) 3 that comprise(s) a defect 35 can be determined by identifying the individual fuel cell assembly 7 at which probe 70 detects a significant variation in the presence of the tracer fluid within fluid flow F relative to an adjacent MEA 3. For example, if probe 70 detects an increase in the presence of the tracer fluid within fluid flow F at level M2, when compared to level M1, then it can be determined that MEA #2 comprises a defect 35.

In a further embodiment, the composition of the tracer fluid within fluid flow F exiting fuel cell stack 5 via orifice 24 may be determined prior to inserting probe 70 into oxidant stream passage 20. In this way, if the presence of the tracer fluid is not detected in fluid flow F, it is not necessary to insert probe 70 into oxidant stream passage 20.

A representative apparatus for locating fluid leaks within fuel cell stack 5 comprises a pressurized fluid supply system adapted to supply (i) a tracer fluid at a constant pressure P to a first fluid stream passage, such as fuel stream passage 10, of fuel cell stack 5 and (ii) a substantially constant fluid flow F to a second fluid stream passage, such as oxidant stream passage 20, of fuel cell stack 5. As described previously, any pressure P, which results in the tracer fluid migrating from the first fluid stream passage through a leak (e.g., an internal transfer leak, due to a defect in an MEA or a crack in a flow field plate, or an external leak) into the second fluid stream passage, but which does not damage components of fuel cell stack 5, is appropriate. The apparatus further comprises a probe, adapted to monitor for the presence of the tracer fluid within fluid flow F, and means for inserting the probe into the second fluid stream passage and moving the probe through the second fluid stream passage.

From the foregoing it will be appreciated that, although a specific embodiment of the method has been described herein for purposes of illustration, various modifications may be made without deviating from the spirit and scope of the method.

For example, the present method is not limited to locating the source(s) of internal transfer leaks between fuel stream passage 10 and oxidant stream passage 20. The present method can assist in locating the source(s) of transfer leaks between any two fluid stream passages within fuel cell stack 5. For example, in order to locate the source(s) of internal transfer leaks between the coolant stream passage and oxidant stream passage 20, instead of directing the tracer fluid to fuel stream passage 10 while monitoring the composition of the tracer fluid within fluid flow F in oxidant stream passage 20, the tracer fluid would be directed to the coolant stream passage.

Figure 2:
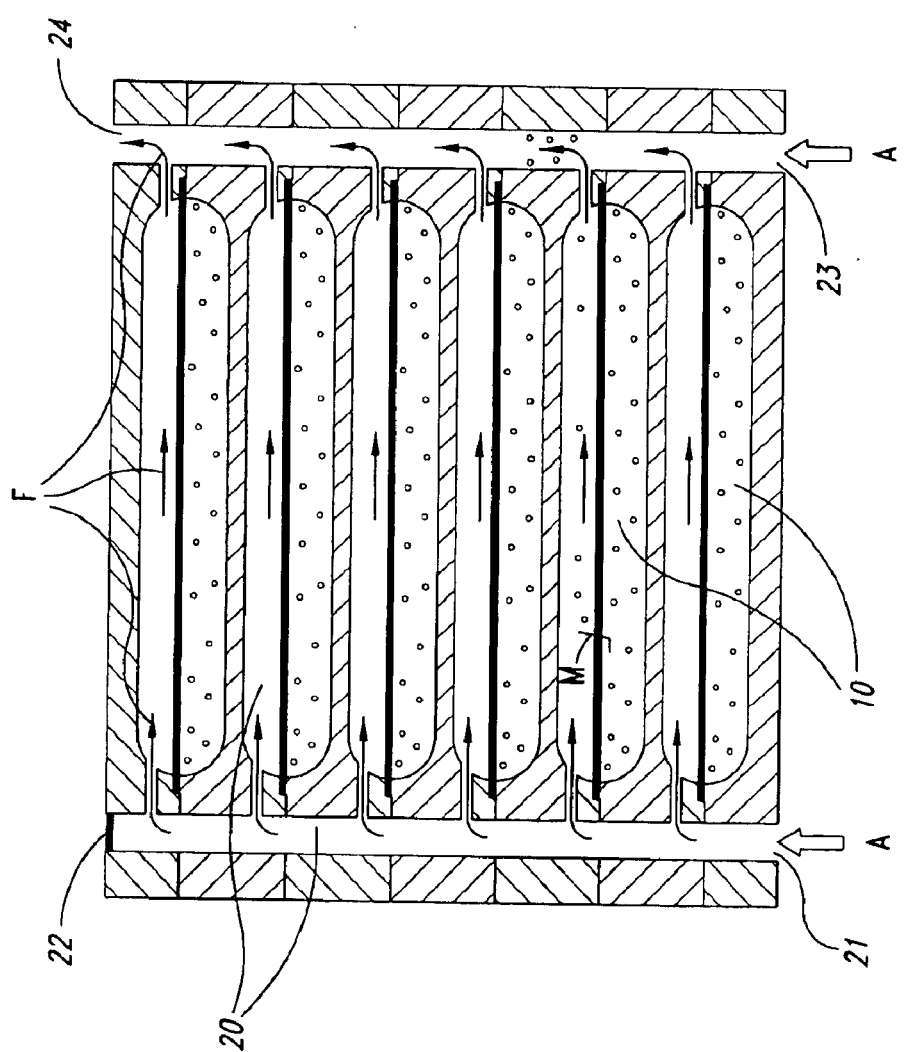
FIG. 2 illustrates steps of a representative method for locating internal transfer leaks within the fuel cell stack of FIG. 1.

Furthermore, as illustrated in FIGS. 2 and 3, the present method is used to locate internal transfer leak(s) between fluid stream passages through a defect in a MEA. However, the method can also be used to locate leaks occurring between reactant streams, or between a reactant stream and a coolant stream, through a crack in a flow field plate.

Additionally, the present method is not limited to locating the source(s) of internal transfer leaks between fluid stream passages within fuel cell stack 5 and may also be used to locate an external leak. For example, fuel cell stack 5 may further comprise a number of tie rod passages (not shown). During normal operation of fuel cell stack 5, tie rods (not shown) are threaded through the tie rod passages and secured to end plates (not shown) located on opposite ends of fuel cell stack 5 to retain and hold fuel cell stack 5 in its assembled condition (typically in a state of compression). In order to locate an external leak occurring through tie rod passages, the stream passage to be tested (fuel stream passage 10 or oxidant stream passage 20 in the current embodiment) would be pressurized with the tracer fluid, fluid flow F would be directed to one, or more, tie rod passage(s) and probe 70 would be used to monitor the composition of the tracer fluid within fluid flow F in the tie rod passage(s). As described previously, the tracer fluid may be directed to any fluid stream passage(s) within fuel cell stack 5. In this way, the present method may be used to locate an external leak in any one of the fluid stream passages of fuel cell stack 5.

The method described herein can be adapted to be part of a more extensive leak testing method. Such method could further be carried out by an automated apparatus. For example, such an apparatus could comprise a fuel cell stack compressor to hold the fuel cell stack being tested in a compression state similar to what it would be in during operation; this would consequently allow for the testing of fuel cell stacks before final assembly. The fuel cell stack compressor could be further adapted so that, when the fuel cell stack to be tested is in place, its fluid stream passages' inlet and outlet ports can be either opened to allow for the passage of fluids and/or probe(s) or closed. Such an apparatus would therefore be able to carry out automatically the method outlined above. For example, referring to FIG. 2, such fuel cell stack compressor could be adapted to place fuel cell stack 5 in a state of compression similar to what it would be in during operation. Such fuel cell stack compressor could further be adapted so that when it places fuel cell stack 5 in a state of compression, it could close orifice 22, leave orifices 21 and 23 open to allow air to flow in and leave orifice 24 open to allow air to flow out. Such fuel cell stack compressor could further be adapted to allow a tracer fluid probe to be inserted through orifice 24. Operation of such probe could also be part of the automated apparatus. Such an embodiment could therefore carry out an internal leak test. Such fuel cell stack compressor could also be further adapted to allow for an external leak test, whereas the fluid stream passages are pressurized and the integrity of the external seals are ascertained by testing whether the pressure within the fluid stream passages remains constant. For example, such block compressor could further be adapted so that when it places fuel cell stack 5 in a state of compression, it could close orifices 22, 23 and 24 and leave orifice 21 open to allow fluid stream passage 20 to be pressurized with air. Such an automated apparatus could comprise an air supply system that can pressurize fluid stream passage 20 and detect any reduction in pressure consequent on external seal leakage. The automated apparatus could be adapted to carry out the external leak test first and then the internal leak test.

While particular elements, embodiments and applications of the present method and apparatus have been shown and described herein for purposes of illustration, various modifications may be made without deviating from the spirit and scope of the invention. Accordingly, the invention is not limited except as by the appended claims.

What is claimed is:

1. A method for locating a fluid leak in a fuel cell stack, the method comprising:
   a) pressurizing a first fluid stream passage with a tracer fluid;
   b) introducing a flow fluid to a second fluid stream passage;
   c) maintaining a substantially constant flow of the flow fluid through the second fluid stream passage toward an exit point of the fuel cell stack;
   d) inserting a probe, adapted to monitor for the presence of the tracer fluid in the flow fluid, into the exit point;
   e) moving the probe through the second fluid stream passage; and
   f) monitoring for the presence of the tracer fluid in the flow fluid at various locations of the second fluid stream passage.

2. The method of claim 1, wherein the tracer fluid is helium.

3. The method of claim 1, wherein the flow fluid is air.

4. The method of claim 1 wherein:
   a) the fuel cell stack comprises a plurality of fuel cell assemblies;
   b) the probe is moved through the second fluid stream passage one fuel cell assembly at a time; and
   c) the presence of the tracer fluid in the flow fluid is monitored at each fuel cell assembly.

5. The method of claim 4, wherein the tracer fluid is helium.

6. The method of claim 4, wherein the flow fluid is air.

7. The method of claim 1, further comprising monitoring for the presence of the tracer fluid in the flow fluid exiting from the exit point prior to inserting the probe into the exit point.

8. The method of claim 7, wherein the tracer fluid is helium.

9. The method of claim 7, wherein the flow fluid is air.

10. An apparatus for locating a fluid leak in a fuel cell stack, the apparatus comprising:

a) a supply system for:
   i) pressurizing a first fluid stream passage with a tracer fluid,
   ii) introducing a flow fluid to a second fluid stream passage, and
   iii) maintaining a substantially constant flow of the flow fluid through the second fluid stream passage toward an exit point of the fuel cell stack;
b) a probe, adapted to monitor for the presence of the tracer fluid in the flow fluid; and
c) means for:
   i) inserting the probe into the exit point, and
   ii) moving the probe through the second fluid stream passage.

11. The apparatus of claim 10, wherein the tracer fluid is helium.

12. The apparatus of claim 11, further comprising a fuel cell stack compressor adapted to place the fuel cell stack in a state of compression similar to what it would be in during operation of the fuel cell stack.

13. The apparatus of claim 10, wherein the flow fluid is air.

14. The apparatus of claim 13, further comprising a fuel cell stack compressor adapted to place the fuel cell stack in a state of compression similar to what it would be in during operation of the fuel cell stack.

* * * * *